(12) United States Patent
Signer et al.

(10) Patent No.: US 8,635,025 B2
(45) Date of Patent: Jan. 21, 2014

(54) METHOD AND SYSTEM FOR TRANSMITTING BOREHOLE IMAGE DATA

(75) Inventors: Claude Signer, Somerville, MA (US); Lucian Johnston, Sugar Land, TX (US); Stein Inge Pedersen, Tananger (NO)

(73) Assignee: Schlumberger Technology Corporation, Sugar Land, TX (US)

( * ) Notice: Subject to any disclaimer, the term of this patent is extended or adjusted under 35 U.S.C. 154(b) by 351 days.

(21) Appl. No.: 11/964,887

(22) Filed: Dec. 27, 2007

(65) Prior Publication Data

US 2009/0167556 A1 Jul. 2, 2009

(51) Int. Cl.
*G01V 1/40* (2006.01)

(52) U.S. Cl.
USPC .......................................................... 702/6

(58) Field of Classification Search
USPC .................................................. 702/6, 9, 13
See application file for complete search history.

(56) References Cited

U.S. PATENT DOCUMENTS

| | | | |
|---|---|---|---|
| 3,069,654 A | 12/1962 | Hough | |
| 4,876,511 A | 10/1989 | Clark | |
| 4,968,940 A | 11/1990 | Clark et al. | |
| 5,184,692 A | 2/1993 | Moriarty | |
| 5,204,673 A | 4/1993 | Kyle et al. | |
| 5,299,128 A | 3/1994 | Antoine et al. | |
| 5,339,037 A | 8/1994 | Bonner et al. | |
| 5,517,464 A | 5/1996 | Lerner et al. | |
| 5,519,668 A | 5/1996 | Montaron | |
| 5,624,051 A | 4/1997 | Ahern, Jr. et al. | |
| 5,899,958 A * | 5/1999 | Dowell et al. | 702/6 |
| 6,173,793 B1 | 1/2001 | Thompson et al. | |
| 6,405,136 B1 * | 6/2002 | Li et al. | 702/10 |
| 6,570,381 B1 | 5/2003 | Speier et al. | |
| 6,631,327 B2 | 10/2003 | Hsu et al. | |
| 6,641,434 B2 | 11/2003 | Boyle et al. | |
| 6,924,646 B2 | 8/2005 | Omeragic | |
| 7,203,342 B2 * | 4/2007 | Pedersen | 382/109 |
| 2005/0132794 A1 | 6/2005 | Spross et al. | |
| 2005/0256645 A1 * | 11/2005 | Rabinovich et al. | 702/7 |
| 2006/0031017 A1 * | 2/2006 | Mathieu et al. | 702/6 |
| 2006/0254767 A1 | 11/2006 | Pabon et al. | |
| 2007/0027629 A1 | 2/2007 | Hassan et al. | |

FOREIGN PATENT DOCUMENTS

| | | |
|---|---|---|
| EP | 1806473 | 7/2007 |
| WO | 2004085796 | 10/2004 |
| WO | 2007092127 | 8/2007 |

OTHER PUBLICATIONS

DL Donoho and X Huo, "Beamlets and Multiscale Image Analysis", Invited Paper, Published in Multiscale and Multiresolution Methods, Theory and Applications, Springer-Verlag, NY, Barth et al., eds. pp. 150-196 (2002).

* cited by examiner

*Primary Examiner* — Mohamed Charioui
(74) *Attorney, Agent, or Firm* — Chadwick A. Sullivan; Brigitte Jeffery Echols

(57) ABSTRACT

A method of transmitting borehole image data from a borehole location to a remote location includes obtaining a set of image data describing formation surrounding a borehole using a logging tool at a selected depth or range of depths in the borehole, extracting one or more image features from the set of image data downhole, and transmitting a representation of the extracted image features to the surface.

19 Claims, 5 Drawing Sheets

METHOD AND SYSTEM FOR TRANSMITTING BOREHOLE IMAGE DATA

FIELD OF THE INVENTION

The invention relates generally to borehole imaging. More specifically, the invention relates to transmission of borehole image data from a downhole location to a surface location in real-time.

BACKGROUND OF THE INVENTION

Borehole imaging involves lowering a specialized logging tool equipped with imaging devices into a borehole. At selected depths in the borehole, the logging tool is rotated within the borehole to generate an image of the formation surrounding the borehole. In wireline logging, the logging tool is lowered into the borehole on the end of an electrical cable or wireline, where the wireline doubles up as a means of transmitting the acquired image data to the surface. The length of the wireline in the borehole also provides a direct measure of the depth of the logging tool in the borehole. Wireline logging can provide high-quality, high-density data quickly and efficiently, but there are situations where wireline logging may be difficult or impossible to run, such as while drilling the borehole, when the borehole is highly deviated or horizontal, or when the borehole is unstable. An alternative to wireline logging is logging-while-drilling (LWD). In a LWD environment, the logging tool is integrated into a drill string deployed in the borehole. Image data collected by the logging tool is stored in memory and retrieved when drilling stops and the drill string is tripped to the surface. A LWD tool can provide a higher quality data than a wireline logging tool because it collects data during or shortly after drilling, before drilling mud invades the formation deeply. However, because of the large volume of data acquired by the tool, only a subset of the acquired data may be sent to the surface in real-time using a non-cabled connection, such as a measurements-while-drilling (MWD) telemetry system.

An image of the formation surrounding the borehole provides information about geological properties of the formation surrounding the borehole. As can be appreciated, if the borehole image is available in real-time, it can be interpreted and used to optimize downhole operations such as drilling. For example, parameters related to the direction and location of the drill bit can be derived from the image and used to geosteer the drill bit or maintain the drill bit within a desired pay zone. Data compression techniques, such as described in U.S. Pat. No. 6,405,136 issued to Li et al., may be used to reduce the size of the image data to facilitate its transmission to the surface in real-time via a MWD telemetry system. However, there are limitations on how much compression can be achieved without corrupting the data and/or the compression may not be significant enough to enable real-time transmission of all the image data needed to generate an accurate visual representation of the formation surrounding the borehole. An alternate approach to transmitting the image data to the surface in real-time is to calculate desired parameters downhole and then send the desired parameters to the surface in real-time. U.S. Pat. No. 5,899,958 issued to Dowel et al. describes a logging tool that acquires an image of formation surrounding a borehole for later retrieval. The logging tool includes a downhole processor that computes dip angle and dip direction from the image data. These parameters can be sent from the borehole to the surface in real-time.

SUMMARY OF THE INVENTION

In one aspect, the invention relates to a method of transmitting borehole image data from downhole to a surface location which comprises obtaining a set of image data describing formation surrounding a borehole using a logging tool at a selected depth or range of depths in the borehole, extracting one or more image features from the set of image data downhole, and transmitting a representation of the extracted image features from downhole to a surface location in real time.

In another aspect, the invention relates to a drilling assembly which comprises a logging tool that obtains a set of image data describing formation surrounding a borehole at a selected depth or range of depths in the borehole, a downhole processor associated with the logging tool that extracts image features from the set of image data downhole, and a wellbore telemetry system that transmits a representation of the image features from downhole to a surface location.

In yet another aspect, the invention relates to a logging tool for acquiring borehole image data which comprises a tool body, an arrangement of borehole imaging devices on the tool body adapted for acquiring a set of image data describing formation surrounding a borehole, and a downhole processor which extracts image features from the set of image data and generates a representation of the image features downhole.

Other features and advantages of the invention will be apparent from the following description and the appended claims.

BRIEF DESCRIPTION OF THE DRAWINGS

The accompanying drawings, described below, illustrate typical embodiments of the invention and are not to be considered limiting of the scope of the invention, for the invention may admit to other equally effective embodiments. The figures are not necessarily to scale, and certain features and certain view of the figures may be shown exaggerated in scale or in schematic in the interest of clarity and conciseness.

DETAILED DESCRIPTION OF THE INVENTION

Figure 1:
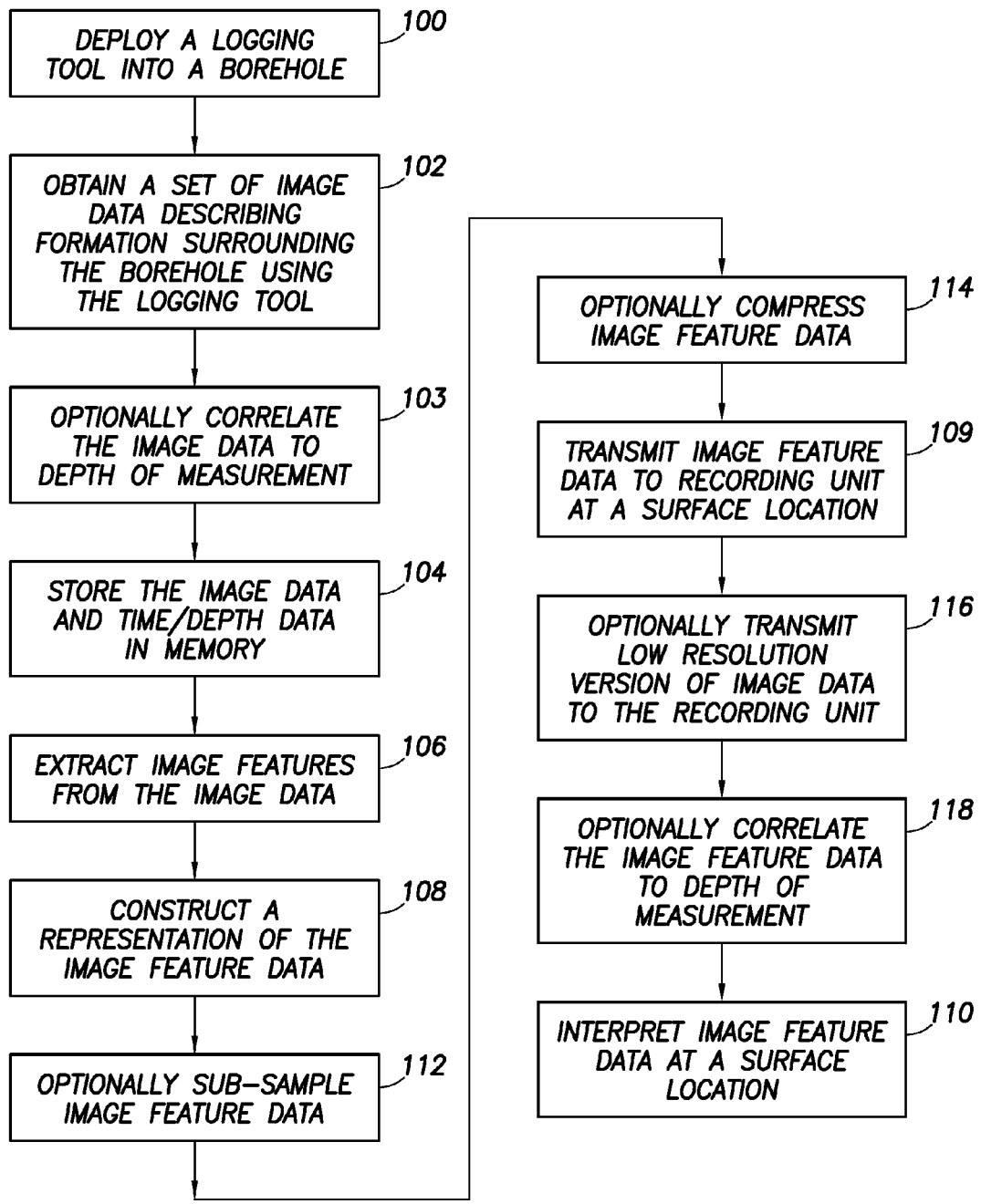
FIG. 1. is a flowchart illustrating a method of transmitting borehole image data from downhole to a surface location.

The invention will now be described in detail with reference to a few preferred embodiments, as illustrated in the accompanying drawings. In describing the preferred embodiments, numerous specific details are set forth in order to provide a thorough understanding of the invention. However, it will be apparent to one skilled in the art that the invention may be practiced without some or all of these specific details. In other instances, well-known features and/or process steps have not been described in detail so as not to unnecessarily obscure the invention. In addition, like or identical reference numerals are used to identify common or similar elements.

FIG. 1 is a flowchart illustrating a method of transmitting borehole image data from downhole to a surface location. The method is described with respect to a logging-while-drilling (LWD) environment. However, the method can be easily adapted to a wireline-logging environment. The method includes deploying a logging tool into a borehole (100). In a LWD environment, the logging tool is included in a bottomhole assembly of a drill string and lowered into the borehole with the drill string. The bottomhole assembly includes at least a drill bit and may further include components that would turn the drill bit at the bottom of the borehole. Oftentimes, the bottomhole assembly includes a bit sub, a mud motor, and drill collars. The bottomhole assembly may also include measurements-while-drilling (MWD) tool and other specialized equipment that would enable directional drilling. The logging tool may be any logging tool capable of obtaining a set of image data describing formation surrounding the borehole. The method is not limited by the manner in which the logging tool obtains the set of image data. In general, the logging tool would provide the set of image data as an array of pixels.

The method includes moving the logging tool inside the borehole to obtain a set of image data describing formation surrounding the borehole at a selected depth or range of depths in the borehole (102). The method may include correlating the image data to depth of measurement (103). Depth may be obtained downhole using known techniques such as described in, for example, U.S. Pat. No. 6,405,136 issued to Li and European Patent No. 1806473. U.S. Pat. No. 6,405,136 describes an encoding technique using azimuth versus depth data derived from an array of button electrodes aligned along the tool axis. European Patent No. 1806473 describes an array of button electrodes aligned along the tool axis. Thus, image data can be coded versus time or versus depth for a second dimension, the first dimension being azimuth. The method further includes storing the set of image data and time/depth data in memory associated with the logging tool (104). The method includes extracting image features from the set of image data downhole, generally at or near the borehole location where the image data was acquired (106). The set of image data may be one that has been correlated to depth of measurement (103) so that the extracted image features are also correlated to depth of measurement. Herein, image features are not derived parameters such as dip angle and dip azimuth. Examples of image features include sinusoids or lines representing bedding or fracture. An objective function is used to specify the desired characteristics of the image features to be extracted from the image data. The method includes constructing a representation of the extracted image features (108). For example, the extracted image features may be represented efficiently as a sequence of coordinate points. Herein, the representation of the extracted image features will be referred to as image feature data. Geometric attributes of the image features, such as thickness and amplitude, may also be included in the image feature data.

Figure 3:
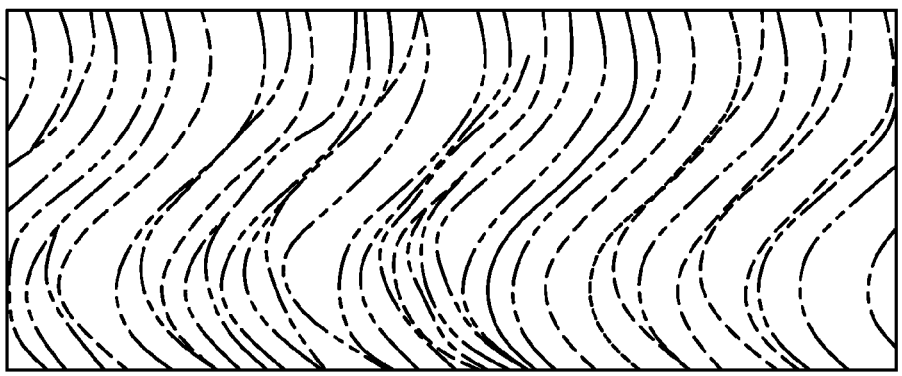
FIG. 3 is a visual representation of image feature data extracted from the image data represented in FIG. 2.
Figure 2:
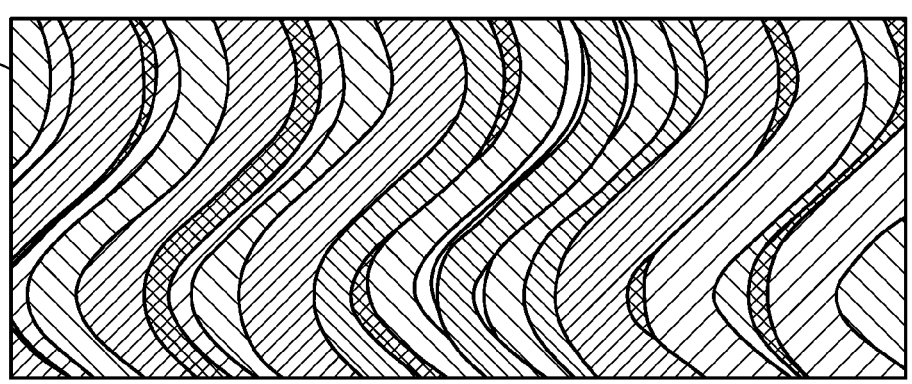
FIG. 2 is a visual representation of image data acquired by an electrical logging tool.

The method includes transmitting the image feature data to a recording unit at a surface location (109) via a wellbore telemetry system, in the case of LWD operations, or via a wireline, in the case of wireline logging. The image feature data may be accompanied by the depth of measurement data. The image feature data transmitted to the surface only contains description of image features and is therefore smaller in size than the original image data and also likely to be much smaller in size than a compressed version of the original image data. The image features are usually smooth, which makes it possible to obtain a further data reduction by sub-sampling the image feature data in the borehole (112) prior to transmitting the data to the surface. The sub-sampled data can be transmitted to the surface (109) and then reconstructed at the surface using, for example, spline interpolation. FIG. 2 shows a visual representation 200 of original image data acquired by an electrical logging tool. FIG. 3 shows a visual representation 300 of image feature data based on extraction of image features from the original image data. As can be observed, the data needed to reproduce the image 300 in FIG. 3 is small in comparison to what is needed to reproduce the image 200 in FIG. 2.

Returning again to FIG. 1, prior to transmitting the image feature data to the surface, the image feature data or sub-sampled version of the image feature data may be compressed (114). Examples of compression techniques are described in U.S. Pat. No. 6,405,136 issued to Li et al., the disclosure of which is incorporated herein by reference, and U.S. Pat. No. 5,519,668 issued to Montaron, the disclosure of which is incorporated herein by reference. Compression may further reduce the size of the image feature data and enable even faster real-time data transmission from downhole to the surface. In addition to transmitting the image feature data from downhole to the surface in real-time, a low-resolution version of the original image data may be transmitted from downhole to the surface (116). At the surface, an operator can overlay the high-resolution image feature data on the low-resolution image data to provide context and quality control for the image features.

At the surface, the image feature data can be interpreted and used as input to one or more formation/borehole analysis processes (110). For example, the image feature data may be used as input for petrophysical interpretation such as carbonate interpretation, e.g., quantifying vuggy porosity. The image feature data may be used as input for structural interpretation of formation surrounding the borehole, such as solid dip data extraction, analysis and classification of the main sedimentary surface boundaries (e.g., beds, erosions, unconformities, fine sedimentary structures, foresets, lamination, and ripples), and faults (e.g., fractures and joints). The image feature data may be used as input for GeoMechanics analysis, such as detecting drilling induced fractures and break outs, pore pressure interpretation, and well stability. The image feature data may be used as input to a process for optimizing drilling of the borehole. For example, the image feature data could be used as part of the change point indicators in automated drilling processes and/or could be coupled to drilling parameters, e.g., mud weight, drill bit rate of penetration, and drill bit rpm. Where correlation of image feature data to depth is not done downhole, the image feature data may be correlated to depth of measurement at the surface (118), typically prior to interpreting the image feature data (110).

Figure 4A:
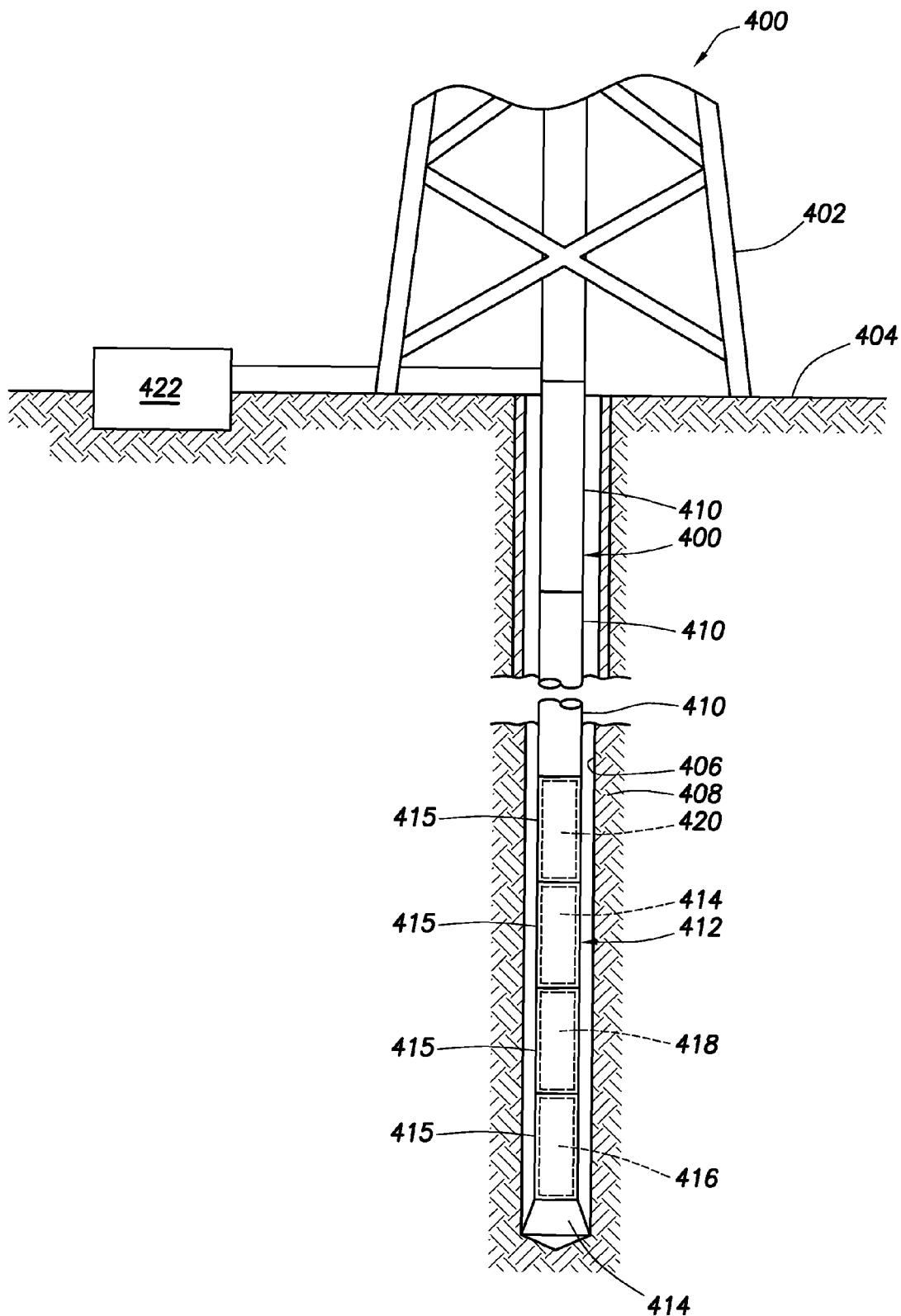
FIG. 4A schematically depicts a drilling assembly suitable for practicing the method illustrated in FIG. 1.

FIG. 4A depicts a drilling assembly 400 extending from a rig 402 at a surface 404 into a borehole 406 traversing subterranean formation 408. The drilling assembly 400 may include drill pipes 410 and a bottomhole assembly 412. Alternatively, the drill pipes 410 may be replaced with coiled tubing and similar structures. For drilling operations, the bottomhole assembly 412 must be connected to the surface 404 via a structure that provides a conduit for drilling mud, such as drill pipes and coiled tubing. The drill pipes 410 allow the bottomhole assembly 412 to be translated and rotated inside the borehole 406. The bottomhole assembly 412 includes a drill bit 414 and a plurality of drill collars 415, each of which may contain one or more tools adapted for performing one or more downhole operations. Those skilled in the art will appreciate that the configuration of the bottomhole assembly 412 can be highly variable depending on the operations to be performed downhole. The bottomhole assembly 412 includes a wellbore telemetry system 414 for transmitting data to the surface in real-time. Examples of wellbore telemetry systems include a mud-pulse telemetry system (such as described in, for example, U.S. Pat. No. 5,517,464 issued to Lerner et al., the disclosure of which is incorporated herein by reference), wired drillpipe telemetry system, (such as described in, for example, U.S. Pat. No. 6,641,434 issued to Boyle et al., the disclosure of which is incorporated herein by reference), electromagnetic telemetry system (such as described in, for example, U.S. Pat. No. 5,624,051, the disclosure of which is incorporated herein by reference, and acoustic telemetry system (such as described in, for example, PCT International Publication No. WO 2004/085796, the disclosure of which is incorporated herein by reference). The wellbore telemetry system 414 may be a standalone tool or may be a component of a MWD tool, such as described in U.S. Pat. No. 4,876,511 issued to Clark, the disclosure of which is incorporated herein by reference, or U.S. Pat. No. 4,968,940 issued to Clark et al, the disclosure of which is incorporated herein by reference.

The bottomhole assembly 412 also includes one or more downhole tools, e.g., tools 416, 418, and 420, configured to perform one or more downhole operations. Such tools may be selected from, for example, LWD tools, MWD tools, and directional drilling tools. Tools 416, 418, and 420 are contained within the drill collars 415 and may be located above or below the wellbore telemetry system 414. In one example, the tool 418 is a logging tool capable of providing a set of image data describing formation surrounding the borehole 406. The logging tool 418 is capable of measuring formation properties in different directions in the borehole 406 and associating the measurements with a selected depth in the borehole. The logging tool 418 may use acoustic, electrical, optical, nuclear, ultrasonic, or magnetic resonance imaging devices to image the formation surrounding the borehole 406. Acoustic images may be selected from radial velocity profiling, compressional velocity image, shear velocity image, properties derived from compressional and shear, i.e., Poisson ratio, Stonely image, properties derived from Stonely, i.e., permeability. See, for example, U.S. Pat. No. 6,631,327 issued to Hsu et al., the disclosure of which is incorporated herein by reference. Nuclear images may be selected from density, neutron, and gamma ray images. See, for example, U.S. Pat. No. 5,184,692 issued to Moriarty, the disclosure of which is incorporated herein by reference. Ultrasonic images may be selected from caliper image and ultrasonic velocity image. See, for example, U.S. Patent Application Publication No. US 2006/0254767 (Pabon et al.), the disclosure of which is incorporated herein by reference. Magnetic resonance imaging sensors are disclosed in, for example, U.S. Pat. No. 6,570,381 issued to Speier et al., the disclosure of which is incorporated herein by reference. Electrical imaging devices are disclosed in, for example, U.S. Pat. No. 6,924,646 issued to Omeragic. Other examples of logging tools are disclosed in, for example, U.S. Pat. No. 5,339,037 issued to Bonner et al., U.S. Pat. No. 6,405,136 issued to Li et al., and European Patent Application No. EP 1806473 A1.

Figure 4B:
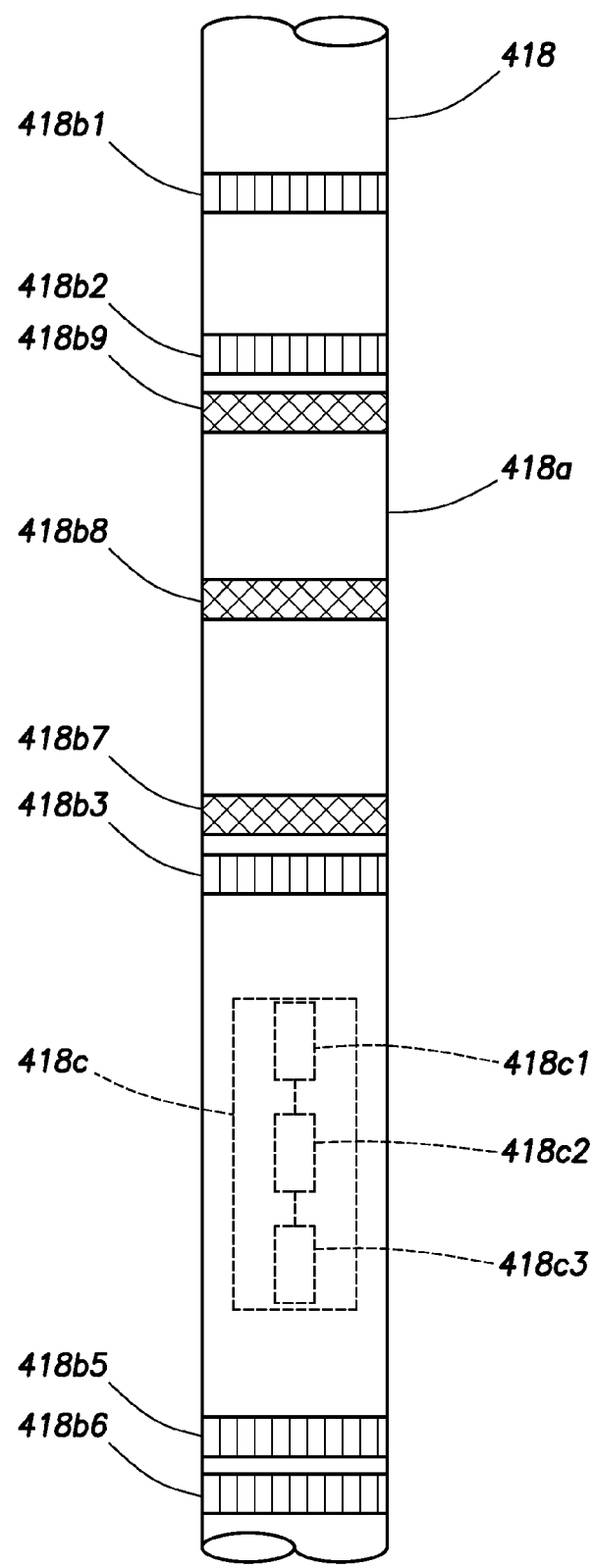
FIG. 4B is an enlarged view of a logging tool included in the drilling assembly of FIG. 4A.

For illustrative purposes and referring to FIG. 4B, the logging tool 418 includes a tool body 418a, which may be electrically conductive. Imaging devices 418b1, 418b2, 418b3, 418b4, 418b5, 418b6, 418b7, 418b8, and 418b9 are mounted on the tool body 418a to image formation surrounding the borehole 406. The exact number, nature, and placement of the imaging devices will vary from one logging tool to the next. The imaging devices may be selected from transmitters, sensors, transducers, electrodes, and camera. In one example, imaging devices 418b1 and 418b5 may be transmitters. Imaging devices 418b2, 418b3, 418b6 may be axial current sensors. Imaging devices 418b9, 418b8, and 418b7 may be lateral current sensors. To make measurements, the logging tool 418 is moved to a desired depth in the borehole and the imaging devices are used to measure electrical properties, e.g., resistivity and/or conductivity, of the geological formation in front of the logging tool. The transmitters 418b1, 418b5 induce currents that travel along the tool body 418a. The axial current sensors 418b2, 418b3, 418b6 measure axial current flowing along the tool body 418a. The lateral current sensors 418b9, 418b8, and 418b7 measure electrical signals resulting from the currents induced by the transmitters 418b1, 418b5.

The logging tool 418 includes electronic module 418c. The electronics module 418c is shown as disposed within the tool body 418a, but it could also be provided in a separate tool body that is proximate or coupled to the tool body 418a. The electronics module 418c includes circuitry for receiving measured signals from the imaging devices (e.g., 418b1, 418b2, 418b3, 418b4, 418b5, 418b6, 418b7, 418b8, and 418b9) and deriving an indication of the properties of the formation from the measured signals. The electronics module 418c may include components such as memory 418c1, power source 418c2, and downhole processor 418c3. The image data, e.g., measured electrical signals and currents, acquired by the logging tool 418 can be stored in memory 418c1. In one example, the logging tool 418 is positioned at a selected depth in the borehole 406 to measure response of formation surrounding the borehole to selected stimuli. The measurements are stored in memory 418c1. After acquiring the image data, the downhole processor 418c3 extracts image features from the image data, as explained above. The downhole processor 418c3 may also perform other downhole functions besides extracting image features from the image data, such as determining depth of measurement and correlating the same to the image data obtained by the logging tool 418, generating a low-resolution image from the image data obtained by the logging tool 418, and performing any preprocessing necessary to convert measured signals into a form useful for image feature extraction. Returning to FIG. 4A, communication is provided between the logging tool 418 and the wellbore telemetry system 414 so that the image feature data extracted from the image data can be sent to a recording unit 422 at the surface 404 in real-time. The wellbore telemetry system 414 may also allow signals from the surface 404 to be transmitted to one or more of the tools 416, 418, 420.

Figure 6:
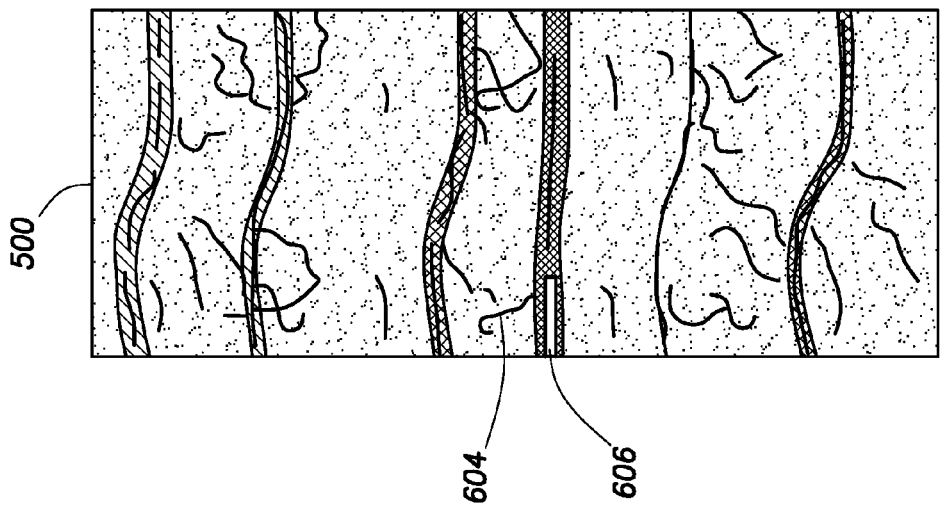
FIG. 6 shows extracted image features overlaid on the visual representation of FIG. 5.
Figure 5:
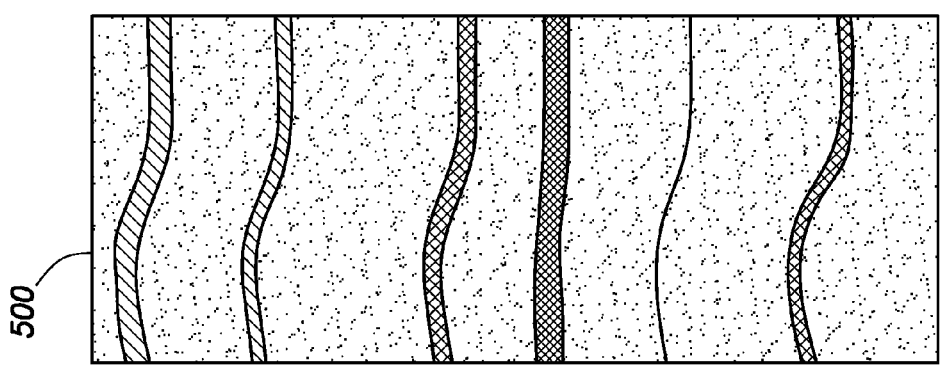
FIG. 5 is a visual representation of image data acquired by an electrical logging tool.

The downhole processor 418c3 may implement any method suitable for extracting features from an image. An example of a suitable method is disclosed in U.S. Pat. No. 7,203,342 issued to Pedersen. The Pedersen method involves (a) selecting an initial cell within an image, (b) selecting an additional cell, near the initial cell, appearing to be associated with a desired feature specified in an objective function, (c) repeating step (b) for further cells, near at least one of the previously selected cells, appearing to be associated with said feature, until selection termination criteria are satisfied, and (d) repeating steps (a)-(c) for other initial cells. The objective function and the termination criteria give information about which points in space may be a member of the desired structure. The Pedersen method is adept at extracting relatively weakly defined features in relatively noisy images. FIG. 5 shows a visual representation 500 of a low-resolution version of image data acquired by an electrical logging tool. FIG. 6 shows extracted image features, e.g., lines 604, 606, overlaid on the low-resolution image data 500 (FIG. 5). Using the Pedersen method, the image features, e.g., lines 604, 606, were extracted from the original image data corresponding to the low-resolution image data 500 (FIG. 5). FIG. 6 shows that there is a good match between the profile of the extracted image features and the image features in the low-resolution image data.

The downhole processor 418c3 is not limited to implementing the Pedersen method or a single method for extracting image features. The downhole processor 418c3 may implement one or multiple methods for extracting image features. In the latter case, each method may be dedicated to extracting a particular set of image features useful for a particular formation/borehole analysis. Another method for extracting image features that may be implemented by the downhole processor 418c3 is disclosed in U.S. Pat. No. 5,299,128 issued to Antoine et al., the disclosure of which is incorporated herein by reference. This method extracts smooth lines in an image. Another method for extracting image features that may be implemented by the downhole processor 418c3 is disclosed in U.S. Pat. No. 3,069,654 issued to Hough, the disclosure of which is incorporated herein by reference. This method extracts sinusoids in an image. Another method for extracting features that may be implemented by the downhole processor 418c3 is disclosed in David L. Donoho and Xiaoming Huo, "Beamlets and Multiscale Image Analysis," in Multiscale and Resolution Methods (J. Barth, T. Chan, and R. Haines, eds.), Lecture Notes in Computational Science and Engineering, pp. 149-196, 2001. This method extracts line segments in an image.

The method described above extracts image features from image data downhole. The extracted image features are represented efficiently and therefore have a smaller size in comparison to the image data. This makes it feasible to transmit the image feature data to the surface in real-time, where the image feature data can be used as input to various formation/borehole analysis in real-time.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method of transmitting borehole image data from downhole to a surface location, comprising:
    obtaining a set of image data describing formation surrounding a borehole using a logging tool at a selected depth or range of depths in the borehole;
    extracting one or more image features from the set of image data downhole;
    generating downhole a transmittable representation of the extracted image features and correlating the representation of the extracted image features to depth of measurement downhole prior to transmitting the representation; and
    transmitting the representation of the extracted image features from downhole to the surface location.

2. The method of claim 1, wherein the representation of the extracted image features includes a description of the extracted image features using a sequence of coordinate points.

3. The method of claim 2, wherein the representation of the extracted image features includes geometric attributes of the image features.

4. The method of claim 1, further comprising sub-sampling the representation of the extracted image features downhole prior to transmitting the representation.

5. The method of claim 1, further comprising compressing the representation of the extracted image features downhole prior to transmitting the representation.

6. The method of claim 1, wherein transmitting the representation of the extracted image features comprises transmitting depth of measurement data.

7. The method of claim 6, further comprising interpreting the representation of the extracted image features and inputting the interpretation to a formation or borehole analysis process.

8. The method of claim 1, further comprising inputting the representation of the extracted image features to a structural interpretation of the formation surrounding the borehole.

9. The method of claim 1, further comprising inputting the representation of the extracted image features to a geomechanic analysis of formation surrounding the borehole.

10. The method of claim 1, further comprising inputting the representation of the extracted image features to a petrophysical interpretation of the formation surrounding the borehole.

11. The method of claim 1, further comprising inputting the representation of the extracted image features to a process for optimizing drilling of the borehole.

12. The method of claim 1, further comprising interpreting the representation of the extracted image features and inputting the interpretation to a formation/borehole analysis process.

13. The method of claim 1, further comprising transmitting a low-resolution version of the image data from downhole to the surface.

14. The method of claim 13, further comprising overlaying the representation of the extracted image features on the low-resolution version of the image data to provide context and quality control for the image features.

15. The method of claim 1, wherein the logging tool provides the set of image data as an array of pixels.

16. The method of claim 1, wherein the image features are extracted according to objective functions specifying characteristics of desired image features.

17. The method of claim 1, wherein the logging tool uses acoustic, electrical, optical, nuclear, ultrasonic, or magnetic resonance imaging devices to obtain the image data.

18. A drilling assembly, comprising:
    a logging tool which obtains a set of image data describing formation surrounding a borehole at a selected depth or range of depths in the borehole;
    a downhole processor associated with the logging tool that extracts image features from the set of image data downhole and generates a transmittable representation of the extracted image features and configured to correlate the representation of the extracted image features to a depth of measurement downhole prior to transmitting the representation; and
    a wellbore telemetry system which transmits the representation of the image features from downhole to a surface location.

19. A logging tool for acquiring borehole image data, comprising:
    a tool body;
    an arrangement of borehole imaging devices on the tool body adapted for acquiring a set of image data describing formation surrounding a borehole at a selected depth or range of depths in the borehole; and
    a downhole processor that extracts image features from the set of image data and generates a representation of the image features downhole and configured to correlate the representation of the extracted image features to a depth of measurement downhole prior to transmitting the representation.

* * * * *